(12) United States Patent
Saxena et al.

(10) Patent No.: US 9,258,306 B2
(45) Date of Patent: Feb. 9, 2016

(54) METHODS FOR CONFIRMING USER INTERACTION IN RESPONSE TO A REQUEST FOR A COMPUTER PROVIDED SERVICE AND DEVICES THEREOF

(71) Applicant: Infosys Limited, Bangalore (IN)

(72) Inventors: Ashutosh Saxena, Hyderabad (IN); Sravan Kumar Rondla, Hyderabad (IN)

(73) Assignee: Infosys Limited, Bangalore (IN)

( * ) Notice: Subject to any disclaimer, the term of this patent is extended or adjusted under 35 U.S.C. 154(b) by 213 days.

(21) Appl. No.: 13/891,986

(22) Filed: May 10, 2013

(65) Prior Publication Data
US 2013/0305321 A1  Nov. 14, 2013

(30) Foreign Application Priority Data
May 11, 2012 (IN) .............................. 1884/CHE/2012

(51) Int. Cl.
| G06F 21/00 | (2013.01) |
| H04L 29/06 | (2006.01) |
| G06F 21/36 | (2013.01) |

(52) U.S. Cl.
CPC .............. *H04L 63/10* (2013.01); *H04L 63/102* (2013.01); *G06F 21/36* (2013.01)

(58) Field of Classification Search
CPC ....... G06F 21/36; G06F 21/31; G06F 21/335; G06F 221/2103; G06F 221/2133
See application file for complete search history.

(56) References Cited

U.S. PATENT DOCUMENTS

| 7,139,740 | B2 | 11/2006 | Ayala |
| 7,139,916 | B2 | 11/2006 | Billingsley et al. |
| 7,149,801 | B2 | 12/2006 | Burrows et al. |
| 7,945,952 | B1 | 5/2011 | Behforooz |
| 8,196,198 | B1 * | 6/2012 | Eger .................. G06F 21/36 726/2 |
| 8,621,209 | B1 * | 12/2013 | Johansson ............ H04L 63/08 713/155 |
| 2002/0120853 | A1 * | 8/2002 | Tyree ......................... 713/188 |
| 2004/0059951 | A1 | 3/2004 | Pinkas et al. |
| 2004/0199597 | A1 | 10/2004 | Libbey et al. |
| 2005/0022925 | A1 | 2/2005 | Janssen |
| 2005/0065802 | A1 | 3/2005 | Rui et al. |
| 2005/0066201 | A1 | 3/2005 | Goodman et al. |
| 2005/0144064 | A1 | 6/2005 | Calabria et al. |
| 2006/0026246 | A1 | 2/2006 | Fukuhara et al. |
| 2006/0047766 | A1 | 3/2006 | Spadea, III |

(Continued)

OTHER PUBLICATIONS

Anonymous, "/aiCaptcha: Using AI to beat CAPTCHA and post comment spam," Jan. 30, 2005, 14 pages, http://www.brains-n-brawn.com/default.aspx?vDir=aicaptcha.

(Continued)

*Primary Examiner* — Mohammad W Reza
*Assistant Examiner* — Kendall Dolly
(74) *Attorney, Agent, or Firm* — LeClairRyan, a Professional Corporation (57) ABSTRACT

A method, non-transitory computer readable medium, and access manager device includes providing an initial challenge to a client computing device requesting access to a service. The initial challenge includes one or more of one or more objects, one or more indicative answers, and one or more questions based on the one or more objects. At least one challenge response to the initial challenge is received from the client computing device. A determination is when there is a match between the at least one challenge response to the initial challenge and corresponding response data associated with the initial challenge. One or more actions with respect to the request to access the service are performed based on the determination.

9 Claims, 5 Drawing Sheets

---

One or more objects: A. $    B. £    C. €

Indicative answer: B and C

Questions:

1. Which of the following are European currencies?    ☒

2. Which of the following have greater value than others?    ☒

3. Which of the following is an Amercian Currency?    ☐

(56) References Cited

U.S. PATENT DOCUMENTS

| | | | |
|---|---|---|---|
| 2006/0095578 | A1 | 5/2006 | Paya et al. |
| 2007/0005500 | A1 | 1/2007 | Steeves et al. |
| 2007/0026372 | A1* | 2/2007 | Huelsbergen ............... 434/322 |
| 2007/0043617 | A1 | 2/2007 | Stein et al. |
| 2007/0043681 | A1 | 2/2007 | Morgan et al. |
| 2008/0066165 | A1* | 3/2008 | Rosenoer ......................... 726/5 |
| 2009/0012855 | A1 | 1/2009 | Jamal et al. |
| 2009/0319274 | A1 | 12/2009 | Gross |
| 2010/0106671 | A1 | 4/2010 | Li et al. |
| 2010/0218111 | A1* | 8/2010 | Mitchell et al. ............... 715/745 |
| 2011/0078778 | A1* | 3/2011 | Gabriel .................. G06F 21/36 726/7 |
| 2011/0209076 | A1 | 8/2011 | Saxena et al. |

OTHER PUBLICATIONS answers.com, "CAPTCHA Computer Desktop Encyclopedia: CAPTCHA," last accessed Mar. 16, 2012, 18 pages, http://www.answers.com/topic/captcha-1.

Atwood, Jeff, "Coding Horror: programming and human factors," Oct. 25, 2006, 30 pages, http://www.codinghorror.com/blog/archives/000712.html.

Baird et al., "Implicit CAPTCHAs," 6 pages, http://www3.lehigh.edu/images/userImages/jgs2/Page_3813/LU-CSE-05-023.pdf (Jan. 16, 2005).

Brainjar, "CAPTCHA Image—Code Project®," Feb. 9, 2004, 9 pages, http://www.codeproject.com/Articles/5947/CAPTCHA-Image.

"Breaking CAPTCHA without OCR," Nov. 30, 2005, 6 pages, http://www.puremango.co.uk/2005/11/breaking_captcha_115/.

"CAPTCHA: Telling Humans and Computers Apart Automatically," last accessed Mar. 16, 2012, 4 pages, http://www.captcha.net.

Festa, Paul, "Spam-bot tests flunk the blind," CNET News, Jul. 2, 2003, 8 pages, http://news.com.com/2100-1032-1022814.html.

"CAPTCHA asp.net Web Control (English)," last accessed Mar. 16, 2012, 5 pages, http://www.guru4.net/english/article/captcha/default.aspx.

Kandula et al., "Botz-4-Sale: Surviving Organized DDoS Attacks That Mimic Flash Crowds," NSDI '05 Technical Paper, 2005, 18 pages, http://www.usenix.org/events/nsdi05/tech/kandula/kandula_html/.

Kellner, Peter, "The Ultimate CAPTCHA Custom Server Control," Aug. 20, 2006, 22 pages, http://peterkellner.net/2006/08/20/the-ultimate-captcha-custom-server-control/.

"BotDetect CAPTCHA Homepage," last accessed Mar. 16, 2012, 2 pages, http://captcha.biz/.

Lopresti, David, "Leveraging the CAPTCHA Problem," May 2005, 15 pages, http://www.cse.lehigh.edu/~lopresti/Publications/2005/hip05.pdf.

Mori et al., "Breaking a Visual CAPTCHA," last accessed Mar. 16, 2012, 4 pages, http://www.cs.sfu.ca/~mori/research/gimpy/.

"Petmail Design," last accessed Mar. 16, 2012, 20 pages, http://petmail.lothar.com/design.html.

"PWNtcha—CAPTCHA Decoder," PWNtcha-Caca Labs, last accessed Mar. 16, 2012, 5 pages, http://caca.zoy.org/wiki/PWNtcha.

"Defeating Captcha—Slashdot," Aug. 24, 2005, 28 pages, http://it.slashdot.org/article.pl?sid=05/08/24/1629213&from=rss.

"The State of Spam," Monthly Report, Jan. 2007, 9 pages, http://www.symantec.com/avcenter/reference/Symantec_Spam_Report_-_January_2007.pdf.

W3C, "Inaccessibilty of CAPTCHA," W3C Working Group Note, Nov. 23, 2005, 10 pages, http://www.w3.org/TR/2005/NOTE-turingtest-20051123/.

WUMPUS1, "A CAPTCHA Server Control for asp.net—Code Project®," Nov. 7, 2004, 9 pages, http://www.codeproject.com/Articles/8751/A-CAPTCHA-Server-Control-for-ASP-NET.

Turing, Alan, "The Alan Turing Internet Scrapbook," last accessed Mar. 16, 2012, 7 pages, http://www.turing.org.uk/turing/scrapbook/test.html.

"phpBB*Creating Communities Worldwide," Aug. 28, 2008, 17 pages, http://blog.phpbb.com/2008/08/28/captchas-in-phpbb/.

"CAPTCHA harder to break using animations," 1 page, http://digg.com/news/story/CAPTCHA_harder_to_break_using_animaitons, last accessed Apr. 16, 2012.

Chellapilla et al., "Building Segmentation Based Human-Friendly Human Interaction Proofs (HIPs)," 2005, pp. 1-26, LNCS 3517, Springer-Verlag Berlin Heidelberg.

Chellapilla et al.,"Using Machine Learning to Break Visual Human Interaction Proofs (HIPs), " 8 pages (2005).

Louis, Sari, 563.10.3 CAPTCHA, PowerPoint Presentation, 2006, 19 pages, University of Illinois.

"Captcha Recognision via Averaging," 2 pages, http://web.archive.org/web/20070202013143/http://www.cip.physik.uni-muenchen.de/~wwieser/misc/captcha/ (Jan. 27, 2007).

"Clearscreen SharpHIP—CAPTCHA Control for asp.net update!" Nov. 10, 2004, 9 pages, http://web.archive.org/web/20051226070330/http://blogs.clearscreen.com/migs/archive/2004/11/10/575.aspx, last accessed Apr. 19, 2012.

"Dynamic image generaion in custom controls," Onion Blogs, Pluralsight Blogs, 2010, 6 pages, http://web.archive.org/web/20100607222416/http://www.pluralsight-training.net/community/blogs/fritz/archive/2005/02/11/5789.aspx (Feb. 11, 2005).

"Neural Park," 4 pages, http://web.archive.org/web/20070211003833/http://www.neuralpark.com/blog/2006/11/01/captcha-this/ (Nov. 1, 2006).

Fox et al., "An Abductive Approach to Hand-written Character Recognition for Multiple Domains", in the Proceedings of the 2006 International Conference on Artificial Intelligence, vol. II, pp. 349-355, H. Arabnia editor, CSREA Press (2006).

Von Ahn et al., "Telling Humans and Computers Apart Automatically," Communications of the ACM 47(2):57-60 (Feb. 2004).

Fischer et al., "Visual CAPTCHAs for Document Authentication," Multimedia Signal Processing IEEE 8th Workshop, pp. 471-474 (Oct. 2006).

Liu, "Classification and Learning for Character Recognition: Comparison of Methods and Remaining Problems," in Machine Learning in Document Analysis and Recognition 90:139-161 (2008).

Coates et al., Pessimal Print: A Reverse Turing Test, Proceedings, Conf. on Document Analysis and Recognition, Seattle, WA, pp. 1154-1158 (Sep. 10, 2001).

APWG, Phishing Activity Trends Report, 8 pages, (Jul. 2005).

APWG, "Phishing Activity Trends Report, 1st Half 2011," 11 pages (2011).

Mori, "Recognizing Objects in Adversarial Clutter: Breaking a Visual CAPTCHA," Computer Vision and Pattern Recognition, Proceedings IEEE Computer Society Conference (vol. 1), 8 pp. (Jun. 18, 2003).

* cited by examiner

| Sl. No | Category | One or more objects | Answer set | Question set | Expected response set |
|---|---|---|---|---|---|
| 1 | Currency symbols | a) $<br>b) £<br>c) € | b and c | 1) Which of the following are European currencies?<br>2) Which of the following have greater value than others?<br>3) Which of the following is the American currency? | 1 and 2 |
| 2 | Geometric Shapes | a) ○<br>b) □<br>c) ◇ | b and c | 1) Which of the following have no edges?<br>2) Which of the following has a radius?<br>3) Which of the following have four edges?<br>4) Which of the following are polygons? | 3 and 4 |

FIG. 3

One or more objects: A. $  B. £  C. €

Indicative answer: B and C

Questions:

1. Which of the following are European currencies?  ☒

2. Which of the following have greater value than others?  ☒

3. Which of the following is an Amercian Currency?  ☐

FIG. 4

METHODS FOR CONFIRMING USER INTERACTION IN RESPONSE TO A REQUEST FOR A COMPUTER PROVIDED SERVICE AND DEVICES THEREOF

This application claims the benefit of Indian Patent Application Filing No. 1884/CHE/2012, filed May 11, 2012, which is hereby incorporated by reference in its entirety.

FIELD

This technology generally relates to methods and devices for managing user access to a requested service and, more particularly, to methods for confirming user interaction in response to a request for a computer provided service and devices thereof.

BACKGROUND

Captcha is a type of challenge-response test used in computing environments to attempt to ensure an entered response is generated by a person and not an automated response generated and entered by a computing device. If these automated responses were not identified and blocked by Captcha, the quality of the service being requested could degrade.

One example of Captcha operates by sending an image with a randomly generated string and added noise which the requesting computing device must key into a field. The noise added to the randomly generated string is designed to prevent automated computing systems from identifying and entering the displayed string. Unfortunately, the added noise can render the Captcha image difficult for the person at the requesting computing device to recognize and correctly enter. Additionally, improving OCR and other image recognition techniques are enabling automated system to identify and enter the string.

Another example of Captcha requires the user at the requesting client computing device to perform and enter the results of certain mathematical operations, although the completion of other types of analytic operations could be required. However, as with the previously described example, automated computing devices are becoming more sophisticated and often are able to scan, execute and correctly enter results for the requested operation.

SUMMARY

A method for confirming user interaction includes providing by an access manager computing device an initial challenge to a client computing device requesting access to a service. The initial challenge includes one or more of one or more objects, one or more indicative answers, and one or more questions based on the one or more objects. At least one challenge response to the initial challenge is received by the access manager computing device from the client computing device. A determination is made by the access manager computing device user when there is a match between the at least one challenge response to the initial challenge and corresponding response data associated with the initial challenge. One or more actions with respect to the request to access the service are performed by the access manager computing device based on the determination.

A non-transitory computer readable medium having stored thereon instructions for confirming user interaction comprising machine executable code which when executed by at least one processor, causes the processor to perform steps including providing an initial challenge to a client computing device requesting access to a service. The initial challenge includes one or more of one or more objects, one or more indicative answers, and one or more questions based on the one or more objects. At least one challenge response to the initial challenge is received from the client computing device. A determination is when there is a match between the at least one challenge response to the initial challenge and corresponding response data associated with the initial challenge. One or more actions with respect to the request to access the service are performed based on the determination.

An access manager computing device comprising one or more processors, a memory, wherein the memory coupled to the one or more processors which are configured to execute programmed instructions stored in the memory including providing an initial challenge to a client computing device requesting access to a service. The initial challenge includes one or more of one or more objects, one or more indicative answers, and one or more questions based on the one or more objects. At least one challenge response to the initial challenge is received from the client computing device. A determination is when there is a match between the at least one challenge response to the initial challenge and corresponding response data associated with the initial challenge. One or more actions with respect to the request to access the service are performed based on the determination.

This technology provides a number of advantages including providing more effective methods, non-transitory computer readable medium and devices for identifying user access by providing only a human user, access to the requested service and significantly reducing automated computer program attacks on the service. Accordingly, this technology makes user interaction to request and access a service easier, while making automated, non-human interactions more difficult to successfully implement. Another advantage of this technology is it easily can be implemented on mobile and other portable computing devices.

DETAILED DESCRIPTION

Figure 1:
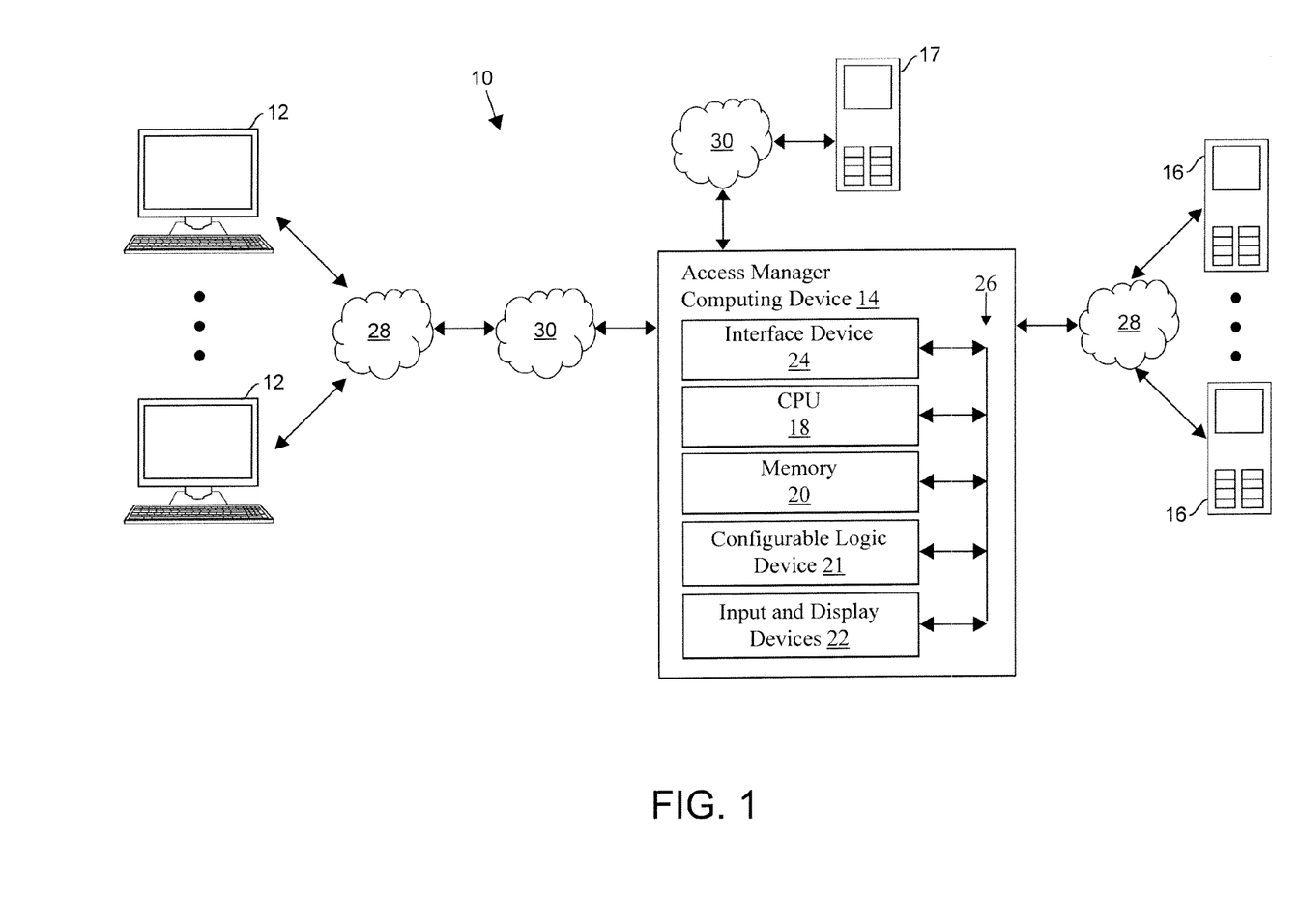
FIG. 1 is a block diagram of an exemplary environment which comprises an exemplary access manager computing device.

An exemplary environment 10 with an access manager computing device 14 that confirms user interaction in response to a request for a computer provided service is illustrated in FIG. 1. The environment 10 includes client computing devices 12, the access manager computing device 14, servers 16 and a knowledge database server 17 which are coupled together by local area networks (LANs) 28 and wide area network (WAN) 30, although the environment can include other types and numbers of devices, components, elements and communication networks in other topologies and deployments. This technology provides a number of advantages including providing more effective methods, non-transitory computer readable medium and devices for confirming user interaction in response to a requested computer provided service.

Referring more specifically to FIG. 1, access manager computing device 14 is coupled to client computing devices 12 through one of the LANs 28, although the client computing devices 12 and access manager computing device 14 may be coupled together via other topologies. Additionally, the access manager computing device 14 is coupled to the servers 16 through the WAN 30 and another one of the LANs 28, although the servers 16 and access manager computing device 14 may be coupled together via other topologies. The access manager computing device 14 also is coupled to the knowledge database server 17 through the WAN 30, although the knowledge database server 17 and the access manager computing device 14 may be coupled together via other topologies.

The access manager computing device 14 assists with confirming user interaction in response to a requested computer provided service as illustrated and described with the examples herein, although access manager computing device 14 may perform other types and numbers of functions. The access manager computing device 14 includes at least one CPU/processor 18, memory 20, configurable logic device 21, input and display devices 22, and interface device 24 which are coupled together by bus 26, although access manager computing device 14 may comprise other types and numbers of elements in other configurations.

Processor(s) 18 in the access manager computing device 14 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2A:
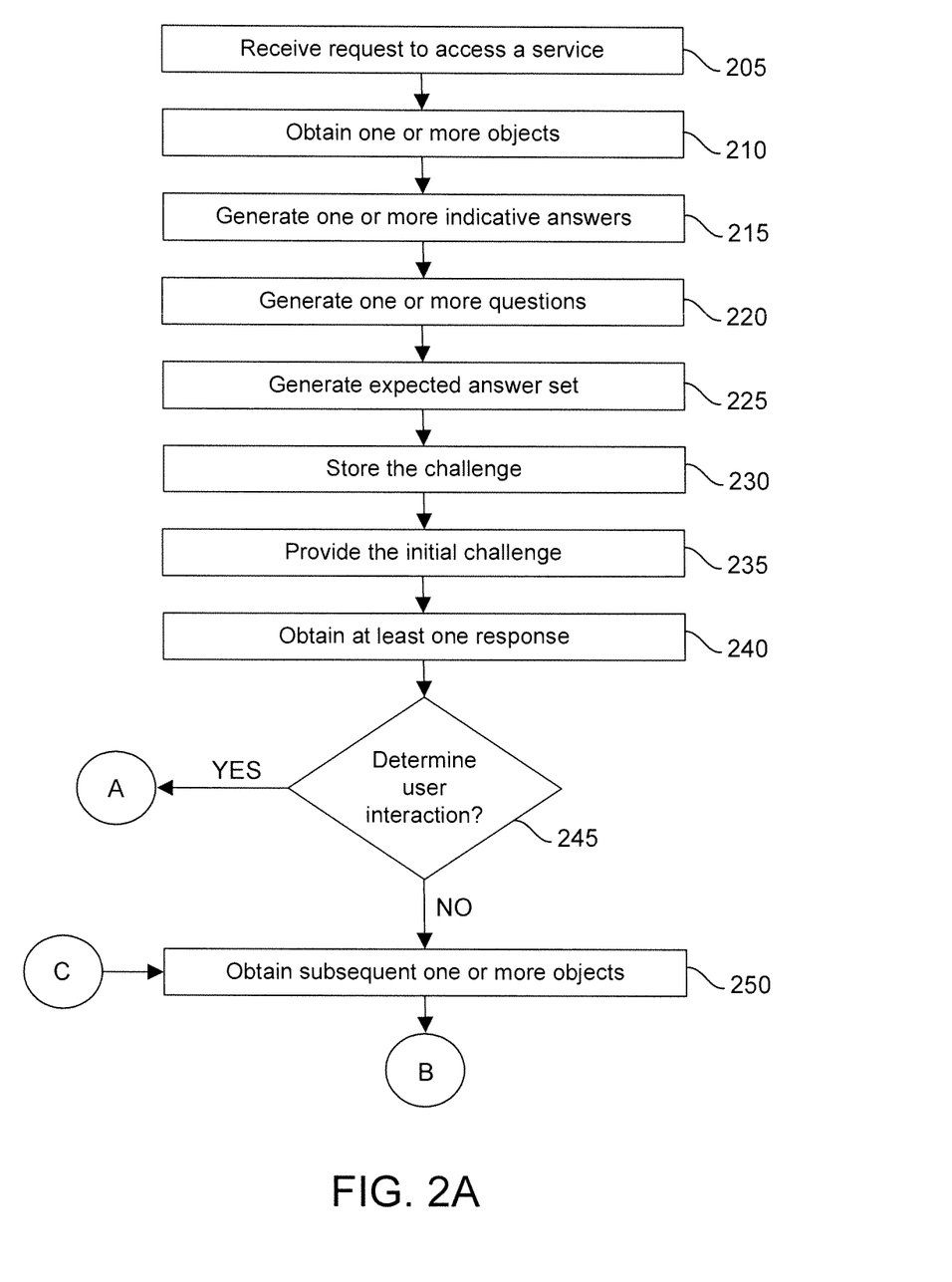
FIGS. 2A-2B is a flowchart of an exemplary method for confirming user interaction in response to a request for a computer provided service.
Figure 2B:
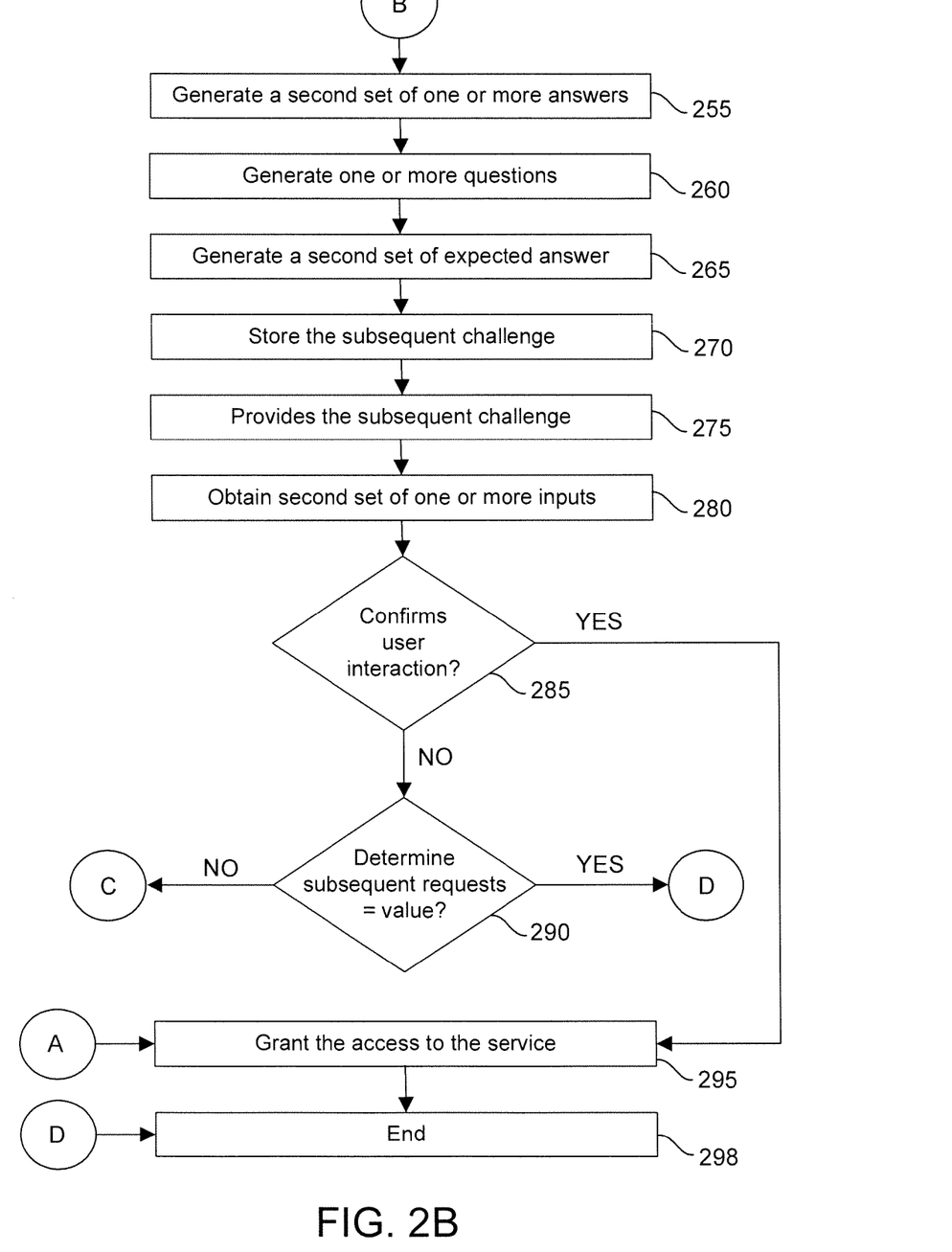

The memory 20 in the access manager computing device 14 stores these programmed instructions for one or more aspects of the present technology as described and illustrated herein, such as the steps illustrated and described with reference to FIGS. 2A-2B that may be embodied or expressed as one or more non-transitory computer or machine readable instructions stored in memory 20 that may be executed by the processor(s) 18 and/or may be implemented by configured logic in the optional configurable logic device 21 by way of example only. Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18.

The configurable logic device 21 may comprise specialized hardware configured to implement one or more steps of this technology as illustrated and described with reference to the examples herein. By way of example only, the optional configurable logic device 21 may comprise one or more of field programmable gate arrays ("FPGAs"), field programmable logic devices ("FPLDs"), application specific integrated circuits (ASICs") and/or programmable logic units ("PLUs").

Input and display devices 22 enable a user, such as an administrator, to interact with the access manager computing device 14, such as to input and/or view data and/or to configure, program and/or operate it by way of example only. Input devices may include a keyboard and/or a computer mouse and/or touch screen devices and display devices may include a computer monitor and/or touch screen devices, although other types and numbers of input devices and display devices could be used.

The interface device 24 in the access manager computing device 14 is used to operatively couple and communicate between the access manager computing device 14, the client computing devices 12, the servers 16, and the knowledge database server 17 which are all coupled together by one or more of the local area networks (LAN) 28 and/or the wide area network (WAN) 30, although other types and numbers of communication networks or systems with other types and numbers of connections and configurations to other devices and elements. By way of example only, the local area networks (LAN) 28 and the wide area network (WAN) 30 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the client computing devices 12, the servers 16 and the knowledge database server 17 include a central processing unit (CPU) or processor, a memory, an interface device, and an I/O system, which are coupled together by a bus or other link, although other numbers and types of network devices could be used. The client computing devices 12, in this example, may run interface applications, such as Web browsers, that may provide an interface to make requests for and send content and/or data to different server based applications at servers 16 via the LANs 28 and/or WANs 30. Additionally, in order for the client computing devices 12 to requests for content to one or more of the servers 16, each of the requesting client computing devices 12 may have to provide user credential information for authentication. Further, the client computing devices 12 can be a mobile device, a personal computer, a tablet, a laptop although the client computing devices 12 can be any other electronic device.

The servers 16 process requests received from requesting client computing devices 12 via LANs 28 and/or WANs 30 according to the HTTP-based application RFC protocol or the CIFS or NFS protocol in this example, but the principles discussed herein are not limited to this example and can include other application protocols. A series of applications may run on the servers 16 that allow the transmission of data, such as a data file or metadata, requested by the client computing devices 12. The servers 16 may provide data or receive data in response to requests directed toward the respective applications on the servers 16 from the client computing devices 12. It is to be understood that the servers 16 may be hardware or software or may represent a system with multiple servers 16, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

The exemplary environment 10 includes a knowledge database server 17. The knowledge database server 17 receives the request from the access manager computing device 14. One or more objects, a plurality of questions based on the one or more objects which are images, text, audio or video or combination thereof, an answer set corresponding to the plurality of questions may reside in the knowledge database server 17 which are used by the access manager computing device 14 to differentiate between a user and an automated computer program attack. The knowledge database server 17 provides one or more objects in the form of images, audio files, video files, or textual data or a combination thereof in response to requests directed toward the knowledge database server 17 from the access manager computing device 14. Additionally, in this example, the data residing in the knowledge database server 17 may also be modified/added/deleted by an administrator interacting through the access manager computing device 14. The knowledge database server 17 also contains information regarding the criticality of the service being requested for access. By way of example only, the access manager computing device 14 may in real-time or dynamically obtain the criticality of the service from the knowledge database server 17.

Although an exemplary environment 10 with the client computing devices 12, the access manager computing device 14, the servers 16, the knowledge database server 17, the LANs 28 and the WAN 30 are described and illustrated herein, other types and numbers of systems, devices, blades, components, and elements in other topologies can be used. It is to be understood that the methods of the examples described herein are for exemplary purposes, as many variations of the specific hardware and software used to implement the examples are possible, as will be appreciated by those skilled in the relevant art(s).

Furthermore, each of the methods of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor or configurable logic, cause the processor to carry out the steps necessary to implement the methods of the examples, as described and illustrated herein.

An exemplary method for confirming user interaction will now be described with reference to FIGS. 1-4. In step 205, the access manager computing device 14 receives a request to access a service, such as an application or data by way of example only, stored in one of the servers 16, which is sent by a client computing device 12. Additionally, with the received request the access manager computing device 14 may receive one or more user credentials along with other additional information, such as the geographical location from which the request from the requesting one of the client computing devices 12 was sent, although other types and amounts of information like but not limited to mental facilities, linguistics expertise of the user can be obtained. By way of example only, the access manager computing device 14 may obtain the geographical location information from the internet protocol address of the requesting one of the client computing devices 12, although other techniques can be used to identify the geographical location.

In step 210, the access manager computing device 14 obtains one or more objects, such as text, or images, or audio files or video files or a combination thereof from the knowledge database server 17 to generate an initial challenge, although other manners for obtaining one or more objects to generate the challenge from other sources or from stored memory 20 within the access manager computing device 14 could be used. In this particular example, the access manager computing device 14 utilizes one or more parameters, such as the geographical location of the one of the client computing devices 12 that submitted the request for the service, the mental faculties of the user and the linguistic expertise of the operator at the requesting one of the client computing devices 12 which is derived from the geographical location by way of example only, to obtain the one or more objects to generate the challenge. Some of the parameters, such as the geographic location, are obtained by the access manager computing device 14 from the received request by identifying the internet protocol address of the received request, while other parameters, like mental faculties, linguistic expertise such as the criticality of the requested service are obtained by the access manager computing device 14 interacting with the knowledge database server 17, although other types and numbers of parameters which are obtained in other manners could be used. In this example, the knowledge database server 17 includes a data in the form of the exemplary table shown in FIG. 3 from which the access manager computing device 14 can utilize the obtained parameters to obtain one or more objects for generating the initial challenge. Additionally, the knowledge database server 17 may store a pre-determined list of services along with their associated individual criticality from which the access manager computing device 14 can utilize the obtained parameter regarding criticality to obtain other information from the knowledge database server 17 for generating the challenge, although other manners for identifying the or otherwise determining the criticality of request service could be used. The criticality of the service can also be obtained in real time from server 16. By way of example only, if a requested service is related to printing, the criticality of the service may be assigned a low value, while other requested services designated as more critical would have higher stored values which can be modified by an administrator or other user.

In step 215, the access manager computing device 14 generates one or more indicative answers by referring to the knowledge database server 17, although other manners of generating one or more indicative answers to generate the initial challenge from other sources or from stored memory 20 within the access manager computing device 14 could be used. In this example, the knowledge database server 17 includes data in the form of the exemplary table shown in FIG. 3 from which the access manager computing device 14 can utilize the obtained parameters from step 205 and step 210 to generate one or more indicative answers for generating the initial challenge. By way of example only, the one or more indicative answers generated or otherwise obtained and provided are one or more options of the one or more objects obtained in step 210 from the knowledge database server 17, for example, "B and C" are the indicative answers as illustrated in FIG. 4. In this particular example, the access manager computing device 14 utilizes one or more parameters, such as the geographical location of the one of the client computing devices 12, the criticality of the requested service, and the linguistic expertise of the operator at the requesting one of the client computing devices 12, to generate or otherwise to obtain and provide the one or more indicative answers from the knowledge database server 17 and to generate the initial challenge as illustrated in FIG. 4, although other parameters may also be considered to generate the one or more indicative answers from the knowledge database server 17.

In step 220, the access manager computing device 14 generates one or more questions by referring to the knowledge database server 17 to generate the initial challenge, although other manners of generating one or more questions to generate the initial challenge from other sources or from stored memory 20 within the access manager computing device 14 could be used. The one or more questions generated by the access manager computing device 14 correspond to the one or more indicative answers obtained in step 215. In this example, the knowledge database server 17 includes data in the form of the exemplary table shown in FIG. 3 from which the access manager computing device 14 can utilize the obtained parameters in step 205 and 210 to generate one or more questions. In this example, the access manager computing device 14 generates and provides questions some of which whose answers corresponds with the indicative answers generated in step 215. By way of example only, the one or more questions generated from the exemplary table stored within the knowledge database server 17 are "Which of the following are European currencies? Which of the following have a greater value than the others? Which of the following is American currency?" for which the correct answers in this particular example are "B and C" as illustrated in FIG. 4. Additionally, the particular set of questions which are generated or otherwise obtained and provided from the knowledge database server 17 are based on geographical location of the one of the client computing devices 12 that submitted the request for the service, the criticality of the requested service, the linguistic expertise of the operator at the requesting one of the client computing devices 12, and the users mental faculties although other parameters may also be considered and used.

In step 225, the access manager computing device 14 generates an expected answer set by referring to the knowledge database server 17, although other manners for generating the expected answer set from other sources or from stored memory 20 within the access manager computing device 14 could be used. In this particular example, the access manager computing device 14 utilizes one or more parameters, such as the geographical location of the one of the client computing devices 12, the criticality of the requested service, and the linguistic expertise of the operator at the requesting one of the client computing devices 12, although other types and numbers of parameters which are obtained in other manners could be used to generate the expected answer set or otherwise obtain and provide the expected the expected answer set from the knowledge database server 17. In this example, the access manager computing device 14 generates an expected answer set which is selection of those questions for which the answer is the one or more indicative answer generated in step 215. By way of example only in FIG. 4, the expected answer set is the selection of "Question 1 and Question 2" for which the answers are "B and C". For example, the answer to the question "Which of the following are the European Currencies" are "B.£ and C.£".

Figure 3:
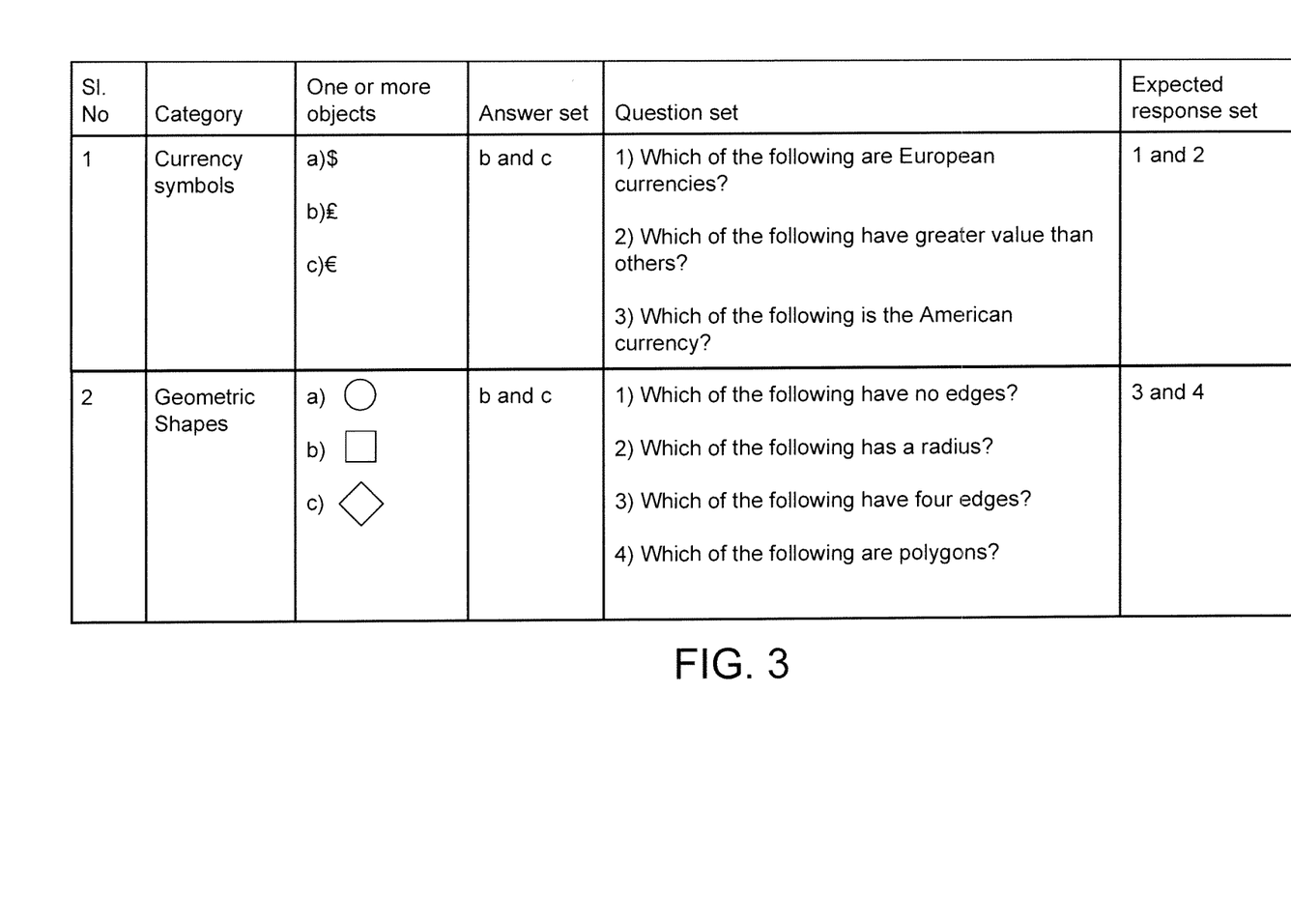
FIG. 3 is a exemplary table representing data in a knowledge database server.
Figure 4:
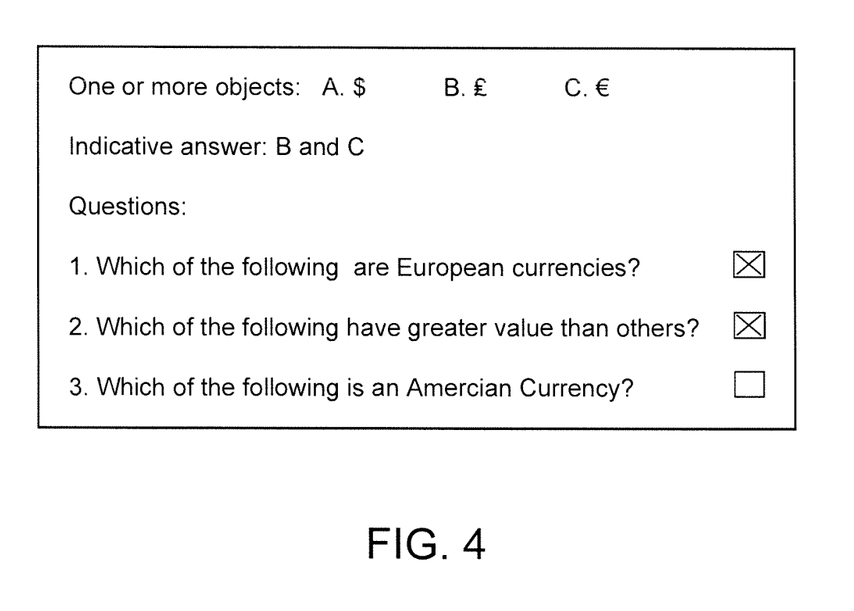
FIG. 4 is an exemplary challenge provided by the access manager computing device.

In step 230, the access manager computing device 14 stores the dynamically generated one or more answers from step 215, the one or more questions generated from step 220 and the expected answer set generated from step 225 in the table present in the knowledge database server 17 as illustrated in FIG. 3, although this information could be stored in other manners or generated in real time.

In step 235, the access manager computing device 14 provides the challenge to the requesting client computing device 12. The challenge includes one or more objects, one or more indicative answers and one or more questions as illustrated by the particular example shown in FIG. 4.

In step 240, the access manager computing device 14 obtains the response back from the client computing device 12 which received the challenge as the response to the initial challenge. By way of example only, the one or more inputs in that response are the selection of the one or more question provided as a challenge to the requesting one of the client computing devices 12.

In step 245, the access manager computing device 14 confirms user interaction by determining if there is a match between the one or more challenge responses associated with the initial challenge and the corresponding data stored in the knowledge database server 17. The corresponding data is the expected answer set generated in step 225. In this particular example if the access manager computing device 14 determines each of the response matches with the expected answer set associated with the initial challenge stored in the table obtained from the knowledge database server 17, then the access manager computing device 14 confirms user interaction and takes a Yes branch is taken to step 290, although other manners for determining an acceptable level of matching could be used. By way of example only, based on the determination of the criticality of the requested service in step 210, the access manager computing device 14 may not require a complete match of all of the responses with the corresponding data in the expected answer set. In this example, if the access manager computing device 14 determines a number of matches between the response and the corresponding data stored in the expected answer set above a stored threshold match number obtained based on the determined criticality, such as at least a match of two out of four responses, then the access manager computing device 14 confirms user interaction and takes a Yes branch is taken to step 290, although other manners for determining an acceptable level of matching could be used.

If in step 245 the access manager computing device 14 determines the one or more responses do not sufficiently match with the expected answer set associated with the initial challenge stored in the table present in the knowledge database server 17, such as a complete match of all or in other examples at least a minimum number of matches, then the No branch is taken to step 250. In step 250, the access manager computing device 14 obtains subsequent one or more objects from the knowledge database server 17 to generate a subsequent challenge.

In step 255, the access manager computing device 14 dynamically generates a second set of one or more indicative answers which are the options for the second one or more objects obtained in step 250. In this example, the second set of indicative answers are generated or otherwise obtained and provided in the same manner as the indicative answers discussed earlier in step 215, although other manners for generating these answers could be used.

In step 260, the access manager computing device generates one or more questions by referring to the second one or more objects obtained from the knowledge database server 17 obtained in step 250 and the one or more answer generated in step 255. Again, in this example the manner of generating the questions here is the same as described earlier in step 220, although other manners for generating these questions could be used.

In step 265, the access manager computing device 14 generates a second expected answer set which is selection of those questions for which the answer is the second set one or more indicative answer generated in step 255. In this example, the second set of expected answers are generated or otherwise obtained and provided in the same manner as the expected answers discussed earlier in step 225, although again other manners for generating these answers could be used.

In step 270, the access manager computing device 14 stores the dynamically generated second set of one or more answers from step 255, the one or more questions from step 260 and the expected answer set from step 265 in the table present in the knowledge database server 17 as illustrated in FIG. 3.

In step 275, the access manager computing device 14 provides the subsequent challenge to the requesting one of the client computing devices 12.

In step 280, the access manager computing device 14 receives the response which is sent from the client computing device 12 as a response to the subsequent challenge which is a selection of one or more selection of the second set of one or more question.

In step 285, the access manager computing device 14 confirms user interaction by comparing the obtained response to the subsequent challenge with the corresponding data stored in the knowledge database server 17. The corresponding data is the second expected answer set generated in step 265. If the access manager computing device 14 confirms that the obtained one or more responses for the subsequent challenge matches with the expected answer set associated with the subsequent challenge present in the table of the knowledge database server 17, then the access manager computing device 14 confirms user interaction and takes the Yes branch is taken to step 295. Again by way of example only, based on the determination of the criticality of the requested service, the access manager computing device 14 may not require a complete match of all of the responses with the corresponding data in the expected answer set for the subsequent challenge. In this example, if the access manager computing device 14 determines a number of matches between the response and the corresponding data stored in the expected answer set is above a stored threshold match number obtained based on the determined criticality, such as at least a match of two out of four responses by way of example only, then the access manager computing device 14 confirms user interaction and takes a Yes branch is taken to step 295, although other manners for determining an acceptable level of matching could be used.

If in step 285 the access manager computing device 14 confirms that the obtained one or more responses for the subsequent challenge does not sufficiently match with the expected answer set associated with the subsequent challenge present, then the access manager computing device 14 does not confirm user interaction and takes the No branch is taken to step 290. In step 290, the access manager computing device 14 determines if a number of generated subsequent challenges equal a maximum number of permitted challenges. The maximum number of permitted challenges can be modified by a user or an administrator using the access manager computing device 14. By way of example only, the maximum number is a numerical value stored within the memory 20 of the access manager computing device 14. The access manager computing device 14 keeps a count of the number of subsequent challenges that it has generated and increments the count value by one each time the access manager computing device 14 generates a new subsequent challenge, although the access manager computing device 14 may keep a track of the number of subsequent requests that it has generated in other manners. If the access manager computing device 14 determines the number of generated subsequent challenges is less than the maximum number of permitted challenges, then the access manger computing device 14 increases the count of generated subsequent challenges by one and then takes a Yes branch back to step 250 to generate a new subsequent challenge. If the access manager computing device 14 determines the number of generated subsequent challenges equals the maximum number of permitted challenges, then the No branch is taken to step 290 to end the process without the access manager computing device 14 granting service to the requested service.

Accordingly as illustrated and described with reference to the examples herein, this technology provides more effective methods, non-transitory computer readable medium and devices for identifying user access by providing only a human user, access to the requested service and significantly reducing automated computer program attacks on the services.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for confirming user interaction, the method comprising:
   providing by an access manager computing device an initial challenge to a client computing device requesting access to a service comprising identifying a geographical location of the request to access the service sent from the client computing device, obtaining one or more parameters from the client computing device, wherein the one or more parameters comprise user related information, determining a category of the questions and content of the questions based on the identified geographical location and the obtained parameters, obtaining a criticality of the service from a knowledge database server in real time, and generating the initial challenge based on the identified geographical location, the determined category and content of the questions, the obtained parameters, and the obtained criticality of the service, wherein the initial challenge comprises one or more objects, one or more indicative answers, and a plurality of questions based on the objects;
   receiving by the access manager computing device a challenge response to the initial challenge from the client computing device, the challenge response comprising at least an indication of a selection by a user of the client computing device of one or more of the questions;
   determining by the access manager computing device a threshold level of correspondence between the challenge response to the initial challenge, comprising the indication of the selection by the user of the client computing device of the one or more of the questions, and corresponding response data, comprising the expected answer set associated with the initial challenge, based on the obtained criticality of the requested service;
   determining by the access manager computing device when there is a match exceeding the threshold level of correspondence between the challenge response to the initial challenge and corresponding response data comprising an expected answer set associated with the initial challenge, wherein the expected answer set is generated based on the indicative answers; and
   performing by the access manager computing device one or more actions with respect to the request to access the service, when the determining indicates there is a match exceeding the threshold level of correspondence between the challenge response to the initial challenge and the corresponding response data comprising the expected answer set associated with the initial challenge.

2. The method as set forth in claim 1 wherein the actions comprise granting by the access manager computing device the client computing device access to the requested service and the method further comprises denying by the access manager computing device the client computing device access to the requested service when the determining indicates there is not a match exceeding the threshold level of correspondence between the challenge response to the initial challenge and corresponding response data comprising the expected answer set associated with the initial challenge.

3. The method as set forth in claim 1 further comprising:
providing by the access manager computing device a subsequent challenge when the determining indicates there is not a match exceeding the threshold level of correspondence between the challenge response to the initial challenge and corresponding response data comprising the expected answer set associated with the initial challenge;
receiving by the access manager computing device a subsequent challenge response to the subsequent challenge from the client computing device;
determining by the access manager computing device when there is a match exceeding the threshold level of correspondence between the subsequent challenge response to the subsequent challenge and corresponding response data comprising another expected answer set associated with the subsequent challenge; and
performing by the access manager computing device the actions with respect to the request to access the service when the determining indicates there is a match exceeding the threshold level of correspondence between the subsequent challenge response to the subsequent challenge and corresponding response data comprising the another expected answer set associated with the subsequent challenge.

4. A non-transitory computer readable medium having stored thereon instructions for confirming user interaction comprising executable code which when executed by at least one processor, causes the processor to perform steps comprising:
providing an initial challenge to a client computing device requesting access to a service comprising identifying a geographical location of the request to access the service sent from the client computing device, obtaining one or more parameters from the client computing device, wherein the one or more parameters comprise user related information, determining a category of the questions and content of the questions based on the identified geographical location and the obtained parameters, obtaining a criticality of the service from a knowledge database server in real time, and generating the initial challenge based on the identified geographical location, the determined category and content of the questions, the obtained parameters, and the obtained criticality of the service, wherein the initial challenge comprises one or more objects, one or more indicative answers, and a plurality of questions based on the objects;
receiving a challenge response to the initial challenge from the client computing device, the challenge response comprising at least an indication of a selection by a user of the client computing device of one or more of the questions;
determining a threshold level of correspondence between the challenge response to the initial challenge, comprising the indication of the selection by the user of the client computing device of the one or more of the questions, and corresponding response data, comprising the expected answer set associated with the initial challenge, based on the obtained criticality of the requested service;
determining when there is a match exceeding the threshold level of correspondence between the challenge response to the initial challenge and corresponding response data comprising an expected answer set associated with the initial challenge, wherein the expected answer set is generated based on the indicative answers; and
performing one or more actions with respect to the request to access the service, when the determining indicates there is a match exceeding the threshold level of correspondence between the challenge response to the initial challenge and the corresponding response data comprising the expected answer set associated with the initial challenge.

5. The medium as set forth in claim 4 wherein the actions comprise granting the client computing device access to the requested service and the executable code, when executed by the processor, further causes the processor to perform at least one additional step comprising denying the client computing device access to the requested service when the determining indicates there is not a match exceeding the threshold level of correspondence between the challenge response to the initial challenge and corresponding response data comprising the expected answer set associated with the initial challenge.

6. The medium as set forth in claim 4 wherein the executable code, when executed by the processor, further causes the processor to perform at least one additional step comprising:
providing a subsequent challenge when the determining indicates there is not a match exceeding the threshold level of correspondence between the challenge response to the initial challenge and corresponding response data comprising the expected answer set associated with the initial challenge;
receiving a subsequent challenge response to the subsequent challenge from the client computing device;
determining when there is a match exceeding the threshold level of correspondence between the subsequent challenge response to the subsequent challenge and corresponding response data comprising another expected answer set associated with the subsequent challenge; and
performing the actions with respect to the request to access the service when the determining indicates there is a match exceeding the threshold level of correspondence between the subsequent challenge response to the subsequent challenge and corresponding response data comprising the another expected answer set associated with the subsequent challenge.

7. An access manager computing device comprising at least one processor and a memory coupled to the processor which is configured to be capable of executing programmed instructions comprising and stored in the memory to:
provide an initial challenge to a client computing device requesting access to a service comprising identifying a geographical location of the request to access the service sent from the client computing device, obtaining one or more parameters from the client computing device, wherein the one or more parameters comprise user related information, determining a category of the questions and content of the questions based on the identified geographical location and the obtained parameters, obtaining a criticality of the service from a knowledge database server in real time, and generating the initial challenge based on the identified geographical location, the determined category and content of the questions, the obtained parameters, and the obtained criticality of the service, wherein the initial challenge comprises one or more objects, one or more indicative answers, and a plurality of questions based on the objects;

receive a challenge response to the initial challenge from the client computing device, the challenge response comprising at least an indication of a selection by a user of the client computing device of one or more of the questions;

determine a threshold level of correspondence between the challenge response to the initial challenge, comprising the indication of the selection by the user of the client computing device of the one or more of the questions, and corresponding response data, comprising the expected answer set associated with the initial challenge, based on the obtained criticality of the requested service;

determine when there is a match exceeding the threshold level of correspondence between the challenge response to the initial challenge and corresponding response data comprising an expected answer set associated with the initial challenge, wherein the expected answer set is generated based on the indicative answers; and perform one or more actions with respect to the request to access the service, when the determining indicates there is a match exceeding the threshold level of correspondence between the challenge response to the initial challenge and the corresponding response data comprising the expected answer set associated with the initial challenge.

8. The device as set forth in claim 7 wherein the actions comprise granting the client computing device access to the requested service and the processor coupled to the memory is further configured to be capable of executing at least one additional programmed instruction to deny the client computing device access to the requested service when the determining indicates there is not a match exceeding the threshold level of correspondence between the challenge response to the initial challenge and corresponding response data comprising the expected answer set associated with the initial challenge.

9. The device as set forth in claim 7 wherein the processor coupled to the memory is further configured to be capable of executing at least one additional programmed instruction to:
provide a subsequent challenge when the determining indicates there is not a match exceeding the threshold level of correspondence between the challenge response to the initial challenge and corresponding response data comprising the expected answer set associated with the initial challenge;

receive a subsequent challenge response to the subsequent challenge from the client computing device;

determine when there is a match exceeding the threshold level of correspondence between the subsequent challenge response to the subsequent challenge and corresponding response data comprising another expected answer set associated with the subsequent challenge; and perform the actions with respect to the request to access the service when the determining indicates there is a match exceeding the threshold level of correspondence between the subsequent challenge response to the subsequent challenge and corresponding response data comprising the another expected answer set associated with the subsequent challenge.

\* \* \* \* \*